US008711872B2

(12) United States Patent
Okada et al.

(10) Patent No.: US 8,711,872 B2
(45) Date of Patent: Apr. 29, 2014

(54) DATA DISTRIBUTION APPARATUS, DATA DISTRIBUTION METHOD, AND DISTRIBUTION CONTROL PROGRAM

(75) Inventors: Shigehiro Okada, Shizuoka (JP); Tetsuya Kato, Shizuoka (JP)

(73) Assignee: NEC Access Technica, Ltd., Shizuoka (JP)

(*) Notice: Subject to any disclaimer, the term of this patent is extended or adjusted under 35 U.S.C. 154(b) by 0 days.

(21) Appl. No.: 12/249,604

(22) Filed: Oct. 10, 2008

(65) Prior Publication Data
US 2009/0097485 A1  Apr. 16, 2009

(30) Foreign Application Priority Data

Oct. 10, 2007  (JP) .................................. 2007-263962

(51) Int. Cl.
*H04J 3/26* (2006.01)
*H04L 12/18* (2006.01)
*H04L 12/56* (2006.01)

(52) U.S. Cl.
CPC ............... *H04L 12/18* (2013.01); *H04L 45/16* (2013.01); *H04L 49/201* (2013.01)
USPC ........................................................ 370/432

(58) Field of Classification Search
USPC ................................................. 370/390, 389
See application file for complete search history.

(56) References Cited

U.S. PATENT DOCUMENTS

| 6,950,431 | B1 | 9/2005 | Nozaki et al. | |
| 7,391,767 | B2* | 6/2008 | Lee et al. | 370/389 |
| 2004/0066781 | A1* | 4/2004 | Shankar et al. | 370/389 |
| 2005/0135365 | A1* | 6/2005 | Sung et al. | 370/390 |
| 2007/0133477 | A1* | 6/2007 | Ebert et al. | 370/335 |
| 2007/0223488 | A1* | 9/2007 | Lee | 370/395.2 |
| 2009/0097485 | A1* | 4/2009 | Okada et al. | 370/390 |

FOREIGN PATENT DOCUMENTS

| JP | 1999331237 A | 11/1999 | |
| JP | 2003348148 A | * 12/2003 | H04L 12/56 |
| JP | 2004179811 A | 6/2004 | |
| JP | 2004242063 A | 8/2004 | |
| JP | 2007005997 A | 1/2007 | |
| KR | 0681004 A | 2/2007 | |

OTHER PUBLICATIONS

M. Takizawa, T. Yoiomoto, Multicast Logical Link for 10G EPON, IEEE 802.3 Working Group Presentation, May 25, 2006.*

(Continued)

*Primary Examiner* — John Blanton
*Assistant Examiner* — Christopher Crutchfield
(74) *Attorney, Agent, or Firm* — Sughrue Mion, PLLC

(57) ABSTRACT

Disclosed is a data distribution apparatus delivering multicast data to a terminal belonging to a multicast group, including: a table generating unit to generate a table including a source address (SA) of the terminal and a destination address (DA) for requesting the multicast data in association with port information of the terminal; an address discrimination unit to discriminate a combination of DA and SA contained in the multicast data; a forwarding destination information generation unit to generate forwarding destination information designating a forwarding destination of the multicast data by obtaining the port information in the table, corresponding to the discriminated combination, and inserts the forwarding destination information in the multicast data for transfer to a L2 switch; and a port selection unit provided in the L2 switch to select port to transfer the multicast data referring to the forwarding destination information and a routing table provided in the L2 switch.

13 Claims, 16 Drawing Sheets

(56) References Cited

OTHER PUBLICATIONS

N. Kim. H. Yun, J. You, T. Kim, B. Kim, M. Kang, Maximized Optical Stream Share of Multicast Videos for Reducing Buffer and Packet Processing in WDM-PON, Digest of The Optical Fiber Communication Conference and Exposition and The National Fiber Optic Engineers Conference, 2006, pp. 1-3.*

M. Zhu, J. Zou, R. Lin, A Novel Implementation of VLAN-Based Multicast Carried on LLID in EPON, Proceedings of the AOE, Oct. 2006, pp. 1-4.*

J. Wang, L. Sin, Z. Jiang, Z. Wu, IGMP Snooping: A VLAN-Based Multicast Protocol, Proceedings of The IEEE 5th International Conference on High Speed Networks and Multimedia Communications, pp. 335-340, Nov. 7, 2002.*

Author Unknown, IEEE Standard for Local Metropolitan Area Networks—Media Access Control (MAC) Bridges, Standard IEEE 802.1D, Jun. 9, 2003, pp. 1-3, 43-44 and 67-76.*

Japanese Office Action for JP2007-263962 issued Aug. 4, 2009.

Korean Office Action for KR10-2008-0099219 issued May 4, 2010.

* cited by examiner

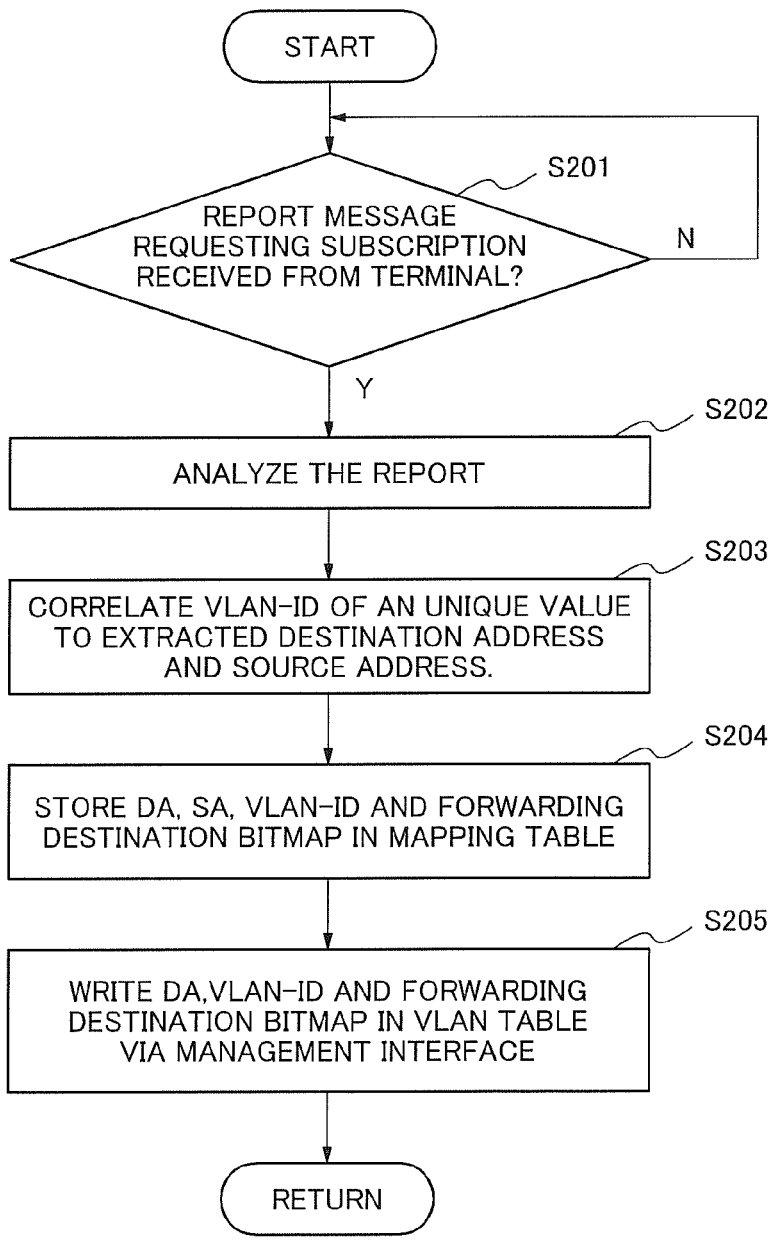

Fig.4A

[MLDv2 REPORT MESSAGE FORMAT]

| TYPE=143(8bit) | RESERVED(8bit) | CHECKSUM(16bit) |
|---|---|---|
| RESERVED(16bit) | | Nr OF MULTICAST ADDRESS RECORDS(M) (16bit) |
| MULTICAST ADDRESS RECORDS[1] | | |
| MULTICAST ADDRESS RECORDS[2] | | |
| MULTICAST ADDRESS RECORDS[3] | | |
| ⋮ | | |
| MULTICAST ADDRESS RECORDS[M] | | |

Fig.4B

[MULTICAST ADDRESS RECORD FORMAT]

| RECORD TYPE (8bit) | AUX DATA LEN (8bit) | NUMBER OF SOURCES(N) (16bit) |
|---|---|---|
| MULTICAST ADDRESS | | |
| SOURCE ADDRESS RECORDS[1] | | |
| SOURCE ADDRESS RECORDS[2] | | |
| SOURCE ADDRESS RECORDS[3] | | |
| ⋮ | | |
| SOURCE ADDRESS RECORDS[N] | | |

Fig.5A (MAPPING TABLE) 131

| TABLE NO. | DA MAC ADDRESS (IP ADDRESS) | SA IP ADDRESS | VLAN·ID | FORWARDING DESTINATION BIT MAP : 1= TRANSMITTED, 0= NOT TRANSMITTED | | | |
|---|---|---|---|---|---|---|---|
| | | | | FIRST PORT | SECOND PORT | THIRD PORT | FOURTH PORT |
| 0 | 01005E0A0A0A(238.10.10.10) | 100.100.100.10 | 0 | 1 | 0 | 0 | 0 |
| 1 | 01005E141414(238.20.20.20) | 100.100.100.20 | 1 | 0 | 1 | 0 | 0 |
| 2 | 01005E14303A(258.20.48.58) | 100.100.100.10 | 2 | 1 | 0 | 0 | 0 |
| 3 | 01005E14303A(258.20.48.58) | 100.100.100.40 | 3 | 0 | 0 | 0 | 1 |
| 4 | 01005E141414(238.20.20.20) | 100.100.100.10 | 4 | 1 | 0 | 0 | 0 |
| 5 | 01005E14303A(258.20.48.58) | 100.100.100.30 | 5 | 0 | 0 | 1 | 0 |
| 6 | | | | | | | |
| ... | | | | | | | |
| 4095 | | | | | | | |

| TABLE NO. | DA MAC ADDRESS (IP ADDRESS) | SA IP ADDRESS | VLAN·ID | FORWARDING DESTINATION BIT MAP : 1= TRANSMITTED, 0= NOT TRANSMITTED | | | |
|---|---|---|---|---|---|---|---|
| | | | | FIRST PORT | SECOND PORT | THIRD PORT | FOURTH PORT |
| 0 | 01005E0A0A0A(238.10.10.10) | 100.100.100.10 | 0 | 1 | 0 | 0 | 0 |
| 1 | 01005E141414(238.20.20.20) | 100.100.100.20 | 1 | 0 | 1 | 0 | 0 |
| 2 | 01005E14303A(258.20.48.58) | 100.100.100.10 | 2 | 1 | 0 | 0 | 0 |
| 3 | 01005E14303A(258.20.48.58) | 100.100.100.40 | 3 | 0 | 0 | 0 | 1 |
| 4 | 01005E141414(238.20.20.20) | 100.100.100.10 | 4 | 1 | 0 | 0 | 0 |
| 5 | 01005E14303A(258.20.48.58) | 100.100.100.30 | 5 | 0 | 0 | 1 | 0 |
| 6 | 01005E0A0A0A(238.10.10.10) | 100.100.100.40 | 6 | 0 | 0 | 0 | 1 |
| ... | | | | | | | |
| 4095 | | | | | | | |

UPDATE

DATA DISTRIBUTION APPARATUS, DATA DISTRIBUTION METHOD, AND DISTRIBUTION CONTROL PROGRAM

This application is based upon and claims the benefit of priority from Japanese Patent Application No. 2007-263962, filed on Oct. 10, 2007, the disclosure of which is incorporated herein in its entirety by reference.

TECHNICAL FIELD

The present invention relates to a distribution apparatus, a distribution method and a control program to deliver data to a terminal.

BACKGROUND ART

In recent years, use of various types of video delivery services via broadband lines has been increasing. Along with the increasing, a multicast communication method is attracting attention. Japanese Patent Application Laid-Open No. 1999-331237 (paragraph [0003]) discloses a communication method, in which data transmitted from a server for video delivery is simultaneously distributed to plural clients on the viewer's side. A terminal on the viewer's side, which enjoys the service, needs to subscribe to a group called a multicast group. Protocol, which processes the subscription or unsubscription to the multicast group, is updated frequently because of increasing of use and enhancing of security level for the image delivery service, with the increasing demand of the services.

Regarding to the protocol to manage a subscriber to the multicast group, IGMP (Internet Group Management Protocol) has been proposed corresponding to IPv4 (Internet Protocol Version 4). Corresponding to IPv6 (Internet Protocol Version 6), MLD (Multicast Listener Discovery) has been proposed.

At present, the latest version of IGMP is the version 3. The latest version of MLD is the version 2. In each of the IGMP and the MLD of version released previous to the latest version, the multicast group is determined based on only a destination address. However, the latest version has been specified so that the multicast group is determined based on a combination of the destination address and a source address.

FIG. 15 is a block diagram illustrating a multicast data distribution system of the related art, where the version of the protocol is previous to the latest version. The version of the IGMP is the version 1 or 2, and the version of the MLD is the version 1.

Referring to FIG. 15, a multicast data distribution system 700 of the related art includes a router 701, a multicast distribution server 703 connected to the router 701 via a broadband line 702, and first to fourth terminals $704_1$-$704_4$ on the viewer's side connected to the router 701. The first to fourth terminals $704_1$-$704_4$ subscribe to the multicast group using a MLDv1 (Multicast Listener Discovery version 1) packet or a IGMPv1 (Internet Group Management Protocol version 1) packet. The multicast distribution server 703 transfers multicast data 706 to the first to fourth terminals $704_1$-$704_4$, which subscribe to the multicast group.

The router 701 is provided with a network processor 713. A ROM (Read Only Memory) 711 for storing a control program to perform communication control and a RAM (Random Access Memory) 712 to temporarily store various types of data used for the communication control are connected to the network processor 713. The network processor 713 is connected to a layer 2 switch (L2SW) 714 via MII (Media Independent Interface) 716 and a management interface 720. The network processor 713 is connected to a physical layer integrated circuit (PHY) 715 via MII 717 and a management interface 721. The layer 2 switch 714 is connected to the first to fourth terminals $704_1$-$704_4$ via a first to fourth LAN (Local Area Network) ports $718_1$-$718_4$. In the following, an interface of the layer 2 switch 714 used for terminal connection is described as a port.

Assume that in the multicast data distribution system 700, the first terminal $704_1$ requests a delivery of video data from the multicast distribution server 703. The first terminal $704_1$ transmits an MLDv1 report message or an IGMPv1 report message (hereinafter, simply referred to as a report message) 722 to the router 701. The report message includes a report relating to subscription or unsubscription to the multicast group. The network processor 713 receives the report message 722 via the layer 2 switch 714 and the MII 716. The network processor extracts the destination address (DA) and a destination port, to which the data is forwarded, from the report message 722. The network processor 713 stores an analysis result into a MAC (Media Access Control) table 731 provided in the layer 2 switch 714.

In the specification, in order to make description clear, a destination MAC address is described as a destination address, and a transmission source MAC address is described as a source address.

SUMMARY

An exemplary object of the invention is to provide a data distribution method and apparatus that can transmit multicast data only to a terminal, which subscribes to a multicast group, even if a source address is not held as a determination factor of a delivery destination.

An apparatus according to exemplary aspect of the invention includes a correspondence table generating unit to generate a table, which includes a source address of the terminal and a destination address for requesting the multicast data in association with port information of the terminal; an address discrimination unit to discriminate a combination of the destination address and the source address contained in the multicast data being received; a forwarding destination information generation unit to generate forwarding destination information, which designates a forwarding destination of the multicast data by obtaining the port information of the terminal, included in the correspondence table, corresponding to the discriminated combination of the destination address and the source address, and inserts the forwarding destination information in the multicast data for transfer to an L2 switch; and a port selection unit provided in the L2 switch to select each port to transfer the multicast data with referring to the forwarding destination information inserted in the multicast data and a routing table provided in the L2 switch.

A method according to an exemplary aspect of the invention includes: generating a correspondence table, which includes a source address of the terminal and a destination address for requesting the multicast data in association with port information of the terminal; discriminating a combination of the destination address and the source address contained in the multicast data being received; generating forwarding destination information, which designates a forwarding destination of the multicast data by obtaining the port information of the terminal, included in the correspondence table, corresponding to the discriminated combination of the destination address and source address; inserting the forwarding destination information in the multicast data for transfer to an L2 switch; and selecting each port to transfer the multicast data with referring to the forwarding destination information inserted in the multicast data and a routing table in the L2 switch.

A recording medium according to an exemplary aspect of the invention, in which a program making a computer execute processing to deliver multicast data to a terminal is recorded, the processing includes: generating a correspondence table, which includes a source address of the terminal and a destination address for requesting the multicast data in association with port information of the terminal; discriminating a combination of the destination address and the source address contained in the multicast data being received; generating forwarding destination information, which designates a forwarding destination of the multicast data by obtaining the port information of the terminal, included in the correspondence table, corresponding to the discriminated combination of the destination address and source address; inserting the forwarding destination information in the multicast data for transfer to an L2 switch; and selecting each port to transfer the multicast data with referring to the forwarding destination information inserted in the multicast data and a routing table in the L2 switch.

BRIEF DESCRIPTION OF THE DRAWINGS

Exemplary features and advantages of the present invention will become apparent from the following detailed description when taken with the accompanying drawings in which:

FIG. 3 is a flow chart illustrating an example of processing of a network processor, which is performed when a terminal subscribes to a multicast group, according to the second exemplary embodiment;

FIGS. 4A and 4B indicate an example of the format of the report message of MLDv2;

FIGS. 5A and 5B indicate an example of a mapping table according to the second exemplary embodiment;

EXEMPLARY EMBODIMENT

Next, a detailed explanation will be given for a first exemplary embodiment with reference to the drawings.

Figure 1:
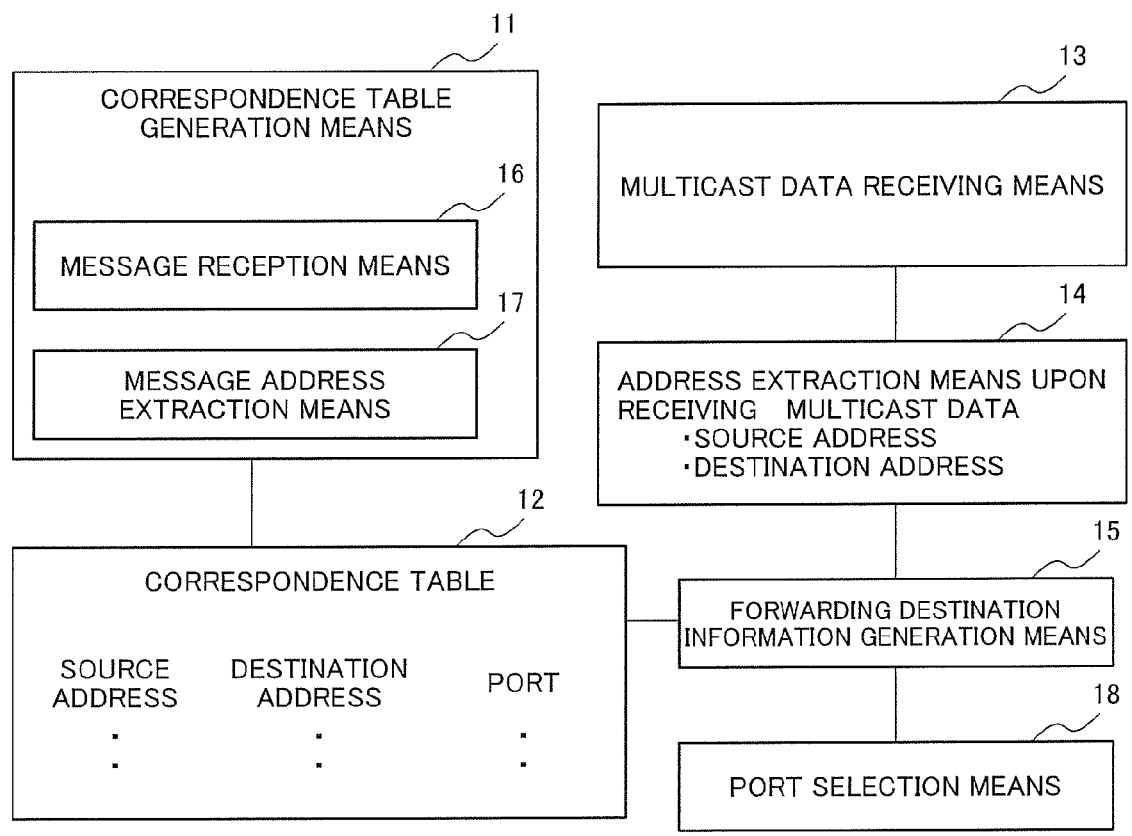
FIG. 1 is a block diagram showing a configuration of a multicast data distribution apparatus according to a first exemplary embodiment.

FIG. 1 is a block diagram showing an example of a configuration of a multicast data distribution apparatus according to the first exemplary embodiment. In FIG. 1, a correspondence table generating means 11 makes a correspondence table 12 including a relation among a source address defining a location of each terminal which is a target of a delivery of multicast data, a destination address of the multicast data and a port to which each terminal is connected. The correspondence table generating means 11 includes a message reception means 16 and a message address extraction means 17. The message reception means 16 receives from each terminal a message about a multicast group managing a delivery of the multicast data. The message address extraction means 17 extracts the source address and the destination address from the message. The correspondence table includes information on the port, to which each terminal is connected. Next, a multicast data receiving means 13 receives the multicast data. An address extraction means upon receiving multicast data 14 extracts the destination address and the source address from the multicast data received by the multicast data receiving means 13. Then, a forwarding destination information generating means 15 refers to the correspondence table 12 based on the destination address and the source address extracted by the address extraction means upon receiving multicast data 14, and generates forwarding destination information indicating a forwarding destination of the multicast data. A port selection means 18 selects a forwarding destination of the multicast data from the ports based on the forwarding destination information.

Figure 2:
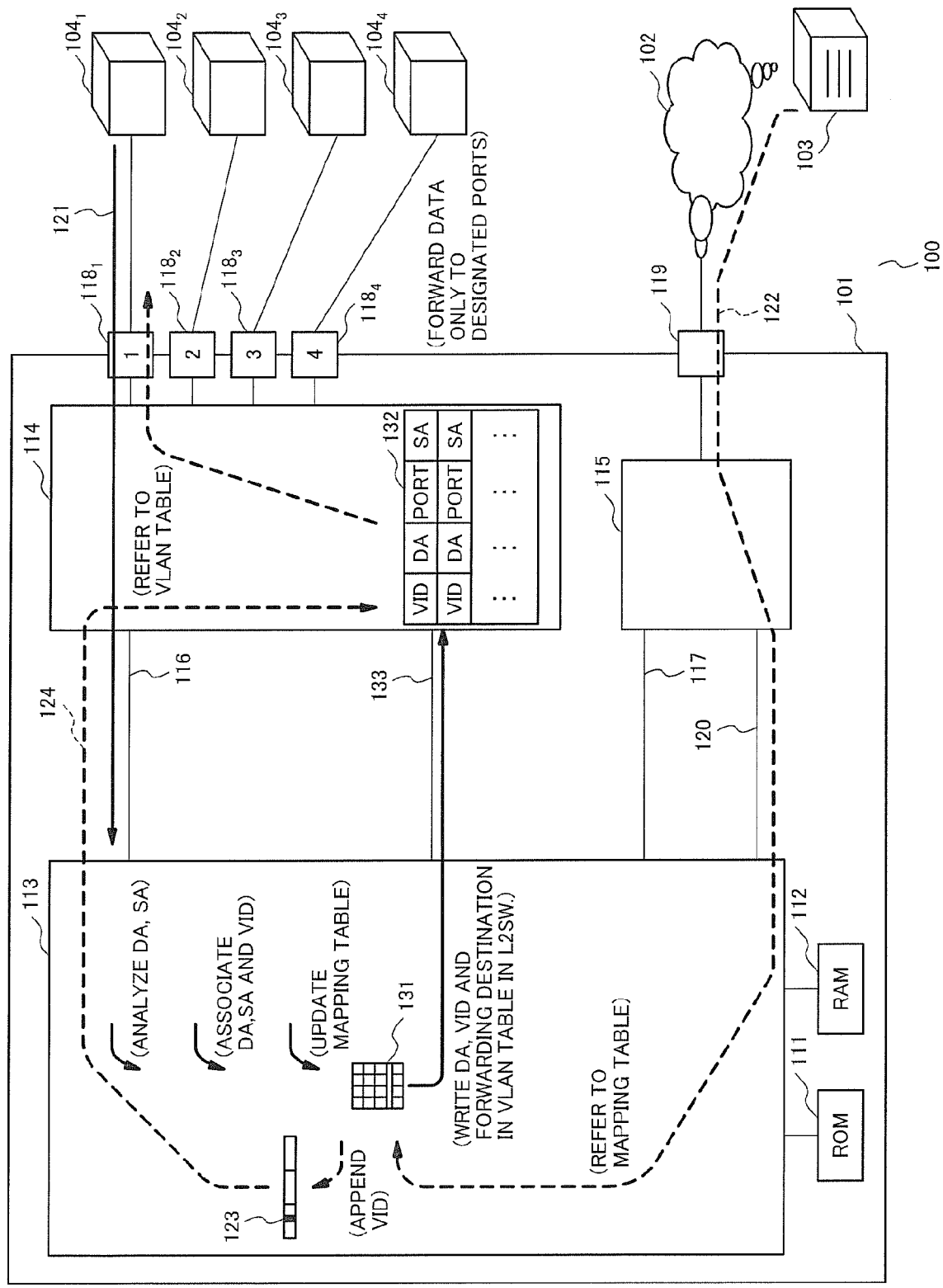
FIG. 2 is a block diagram showing an example of a multicast data distribution system according to a second exemplary embodiment.

FIG. 2 is a block diagram showing an example of a multicast data distribution system, which adopts a router as a multicast data transfer apparatus according to a second exemplary embodiment. A multicast data distribution system 100 includes a router 101, a multicast distribution server 103 connected to the router 101 via a broadband line 102 and first to fourth terminals $104_1$-$104_4$ on the viewer's side connected to the router 101. The first to fourth terminals $104_1$-$104_4$, which transmit an MLDv2 (Multicast Listener Discovery version 2) packet or a IGMPv3 (Internet Group Management Protocol version 3) packet, subscribe to a multicast group by the packet processing. The multicast distribution server 103 transfers the multicast data to the first to fourth terminals $104_1$-$104_4$, which subscribe to the multicast group.

The router 101 includes a network processor 113, layer 2 switch (L2SW) 114 and a physical layer integrated circuit (PHY) 115. The network processor 113 includes ROM 111 storing a control program to perform communication control and RAM 112 temporarily storing data used for the communication control. The network processor 113 is connected to the layer 2 switch (L2SW) 114 via a MII 116 and a management interface 133. The network processor 113 is connected to the physical layer integrated circuit (PHY) 115 via a MII 117 and a management interface 120. The layer 2 switch 114 is connected to the first to fourth terminals $104_1$-$104_4$ via first to fourth LAN ports $118_1$-$118_4$. In the following of the specification, an interface connecting a terminal with the layer 2 switch 114 is described as a port.

Assume that in the multicast data distribution system 100, the first terminal $104_1$ requests a delivery of a given image from the multicast distribution server 103. The first terminal $104_1$ transmits an MLDv2 report message or an IGMPv3 report message (hereinafter, simply referred to as a report message) 121, including change information on status change, i.e. subscription or unsubscription to the multicast group, to the router 101. The network processor 113 receives the report message 121 via the layer 2 switch 114 and the MII 116, and analyzes the received report message 121. The network processor 113 generates a VLAN-ID (Virtual LAN Identifier: simply referred to as VID in the drawings) 123 based on the analysis result. The network processor 113 appends the VLAN-ID 123, which the layer 2 switch 114 distinguishes, to a packet 122 of the multicast data. Then, the network processor 113 converts the packet 122, received from the multicast distribution server 103 via a WAN port 119, into a packet 124. The packet 124 is sent to the layer 2 switch 114.

The layer 2 switch 114 refers to the VLAN-ID 123 appended to the packet 124 sent from the network processor 113. As a result of the reference, the first LAN port $118_1$ is determined as a destination, and the packet 124 is transferred to the first LAN port $118_1$. Then, the first terminal $104_1$ receives a delivery of the video data from the multicast distribution server 103.

As mentioned above, in the multicast data distribution system 100 according to the exemplary embodiment, information, used by the layer 2 switch 114 to determine a forwarding destination port, is appended by the network processor 113 to the packet 122 of the multicast data in advance. The existing layer 2 switch 114 of the previous version refers only the destination MAC address to determine the forwarding destination of the multicast data. Even when the existing layer 2 switch 114 is used, the multicast data, for which subscription or unsubscription to a multicast group are controlled by MLDv2 or IGMPv3, is transferred to a port (in the example, the first LAN port $118_1$) designated by the viewer's side as a destination.

The layer 2 switch 114 includes following features.

(1) When the layer 2 switch 114 can accept VLAN, the network processor 113 analyzes the report message with the corresponding protocol of MLDv2 or IGMPv3. The destination address and the source address included in the MLDv2 report message 121 or the IGMPv3 report message 121 are extracted. A VLAN-ID 123 is associated with the pair of the extracted destination address and the source address. A set of the address and the VLAN as above is registered in the mapping table 131 managed by the network processor 113.

The network processor 113 identifies from which of the first to fourth LAN ports $118_1$-$118_4$ the MLDv2 report message 121 or the IGMPv3 report message 121 is transmitted. The network processor 113 also registers the information in the mapping table 131 as a forwarding destination port. The destination address (DA), the source address (SA) and the forwarding destination port of the data are registered in a VLAN table 132 in L2SW arranged in the layer 2 switch 114 via the management interface 133.

Upon receiving the multicast data from the multicast distribution server 103, the network processor 113 searches for the VLAN-ID 123 corresponding to the addresses, from the mapping table 131 based on the destination address (DA) and the source address (SA). Then, the network processor 113 appends a VLAN tag including the searched VLAN-ID 123, to the packet 124. The packet 124 is transferred to the layer 2 switch 114.

The layer 2 switch 114 refers to the VLAN-ID 123 included in the VLAN tag and the destination address (DA). The multicast data is transferred to a port of the first to fourth LAN ports $118_1$-$118_4$, determined as a forwarding destination based on the information.

(2) When a specific packet format to a vendor is used, the network processor 113 analyzes the report message with the corresponding protocol of MLDv2 or IGMPv3. The destination address and the source address included in a MLDv2 report message 121 or a IGMPv3 report message 121 are extracted. A VLAN-ID 123 is associated with the pair of the extracted destination address and the source address. A set of the addresses and the VLAN as above is registered in the mapping table 131 managed by the network processor 113.

The network processor 113 identifies from which of the first to fourth LAN ports $118_1$-$118_4$ the MLDv2 report message 121 or the IGMPv3 report message 121 is transmitted. The network processor 113 also registers the information in the mapping table 131 as the forwarding destination port. The above processing is the same as in the case (1) described above, where the layer 2 switch 114 accepts the VLAN. However, in this case (2), the data is not registered in the VLAN table 132 arranged in the layer 2 switch 114.

Upon receiving the multicast data from the multicast distribution server 103, the network processor 113 searches for the VLAN-ID (VID) 123 corresponding to the addresses, from the mapping table 131, based on the destination address (DA) and the source address (SA). The specific packet format to the vendor in many cases includes a bitmap field designating a forwarding destination. In such a case, a value corresponding to the searched forwarding destination is set in a forwarding destination designation bit included in the packet format specific to a vendor. The packet is transferred to the layer 2 switch 114 according to the corresponding value.

Upon receiving the packet 124, the layer 2 switch 114 transfers the data to a port of the first to fourth LAN ports $118_1$-$118_4$, which is designated by the forwarding destination designation bits in the packet format specific to a vendor. Here, the packet format specific to a vendor is a tag having the same or a similar format as, for example, a header added in front of an Ethernet™ packet, a trailer at the end of it, or the VLAN tag.

An example of an operation of the router 101 is described above. A description on each unit of the apparatus is as follows. The network processor 113 controls each unit in the router 101 and processes data. The ROM 111 is a non-volatile memory, which stores a control program and setting data for controlling the network processor 113. Data stored in the ROM 111 is developed and held by the RAM 112. The RAM 112 also stores communication data and temporary work data.

The layer 2 switch 114 includes a switching IC (Integrated Circuit) for Ethernet™ layer 2. The layer 2 switch 114 terminates Ethernet™ and transfers data according to the learned MAC address. In the exemplary embodiment, the layer 2 switch 114 includes a VLAN function.

The physical layer integrated circuit (PHY) 115 is a circuit for the physical layer of Ethernet™. The physical layer integrated circuit (PHY) 115 includes an IC card which converts data and electric signals of Ethernet™. In the exemplary embodiment, the physical layer integrated circuit (PHY) 115 converts communication data to and from the broadband line.

The MII 116 and 117 generally are interfaces between a MAC layer control LSI (Large Scale Integration) and a transceiver (not illustrated). In the exemplary embodiment, the MII 116 is an interface transferring data between the network processor 113 and the layer 2 switch 114, and the MII 117 is an interface transferring data between the network processor 113 and the physical layer integrated circuit 115.

The management interface 133 and 120 are interfaces used for controlling or setting the layer 2 switch 114 and the physical layer integrated circuit 115. Each of the first to fourth terminals $104_1$-$104_4$ is connected to an information processing apparatus such as a personal computer and a set-top box (not illustrated) and makes the information processing apparatus accessible to the internet. The broadband line 102 includes a public communication line such as ADSL (Asymmetric Digital Subscriber Line) or an optical fiber, which can be connected to the internet at a high speed. The multicast distribution server 103 is a server delivering the multicast data. The server 103 send the same data to plural designated destinations.

The first to fourth LAN ports $118_1$-$118_4$ are, for example, Ethernet™ physical interfaces (RJ-45 connector). In the exemplary embodiment, the LAN ports include four ports. The LAN ports are connection interfaces to the first to fourth terminals $104_1$-$104_4$. In the specification, a notation such as the first port and the second port means the connector port number of the first to fourth LAN ports $118_1$-$118_4$. The WAN port 119 also is the Ethernet™ physical interface (RJ-45 connector) and is a connection interface to a broadband line.

FIG. 3 is a flow chart showing an example of processing of the network processor for making a terminal subscribe to the multicast group according to the exemplary embodiment. The processing is described as follows referring to FIGS. 2 and 3. Hereinafter, the MLDv2 report message 121 or the IGMPv3 report message 121 to subscribe to the multicast group is described as the report message 121. The report message 121 from the first to fourth terminals $104_1$-$104_4$ requests subscription or unsubscription to the multicast group to the multicast distribution server 103. The network processor 113 receives the report message 121 sent from the terminal 104 via the layer 2 switch 114 (Step S201).

FIG. 4A shows an example of a format of the report message of MLDv2. 'Multicast Address' in the report message 121 of MLDv2 indicates the destination address (DA).

In FIG. 4A, 'Type' shows the type of the MLD message. When 'Type' is '143' as shown in FIG. 4A, it means 'Multicast 1: Listener Report'. 'Type' indicates 'Multicast 1: Listener Query' when 'Type' is '130'. 'Reserved' is an undefined field and is ignored. An example of a format of Multicast Address Records included in FIG. 4A is shown in FIG. 4B.

FIG. 3 is described here. Upon receiving the report message 121 requesting subscription (step S201: Y), the network processor 113 analyzes the report message (Step S202) and extracts necessary information from the report message 121. The destination address (DA) and the source address (SA) are needed. The network processor 113 associates a VLAN-ID 123 having a unique value with each of the extracted destination address (DA) and the source address (SA) (Step S203).

Here, the VLAN-ID includes a frame configuration based upon IEEE (Institute of Electrical and Electronic Engineers) 802.1q, having 12 bits, and takes a value from '0' to '4095'. Actually, a value is associated with a combination of the destination address (DA) and the source address (SA) in series from '0' by a counter (not illustrated). Then, the destination address (DA), the source address (SA), the VLAN-ID 123 and a bitmap indicating the forwarding destination port is written and stored in the mapping table 131, which is reserved in an area in the ROM 111 (Step S204).

FIGS. 5A and 5B show an example of the mapping table. A value of the table number of the mapping table 131 accords with the value of VLAN-ID 123 and 4096 combinations can be registered.

FIG. 5A shows a status where the table numbers up to '5' are registered. In FIG. 5, a line of the table number '0' indicates information, registered on receiving a report message, in which the MAC address (IP address) of the destination address (DA) is '01005E0A0A0A (238.10.10.10)' and the IP address as the source address (SA) is '100.100.100.10'. The value '0' of the VLAN-ID 123 is associated with this data. In a bitmap indicating the forwarding destination port, "to be transmitted" is defined as '1' and "not to be transmitted" is defined as '0. When the first LAN port $118_1$ is allocated to '1', the bitmap indicating the forwarding destination port corresponding to the source address (SA) becomes '1000'.

Then, the network processor 113 newly receives the report message 121 (step S201: Y of FIG. 3). As shown in FIG. 5B, the report message is a report message to request to subscribe to the multicast group and the MAC address (IP address) of the destination address (DA) is '01005E0A0A0A (238.10.10.10)'. The network processor 113 confirms that a combination of the destination address (DA) '238.10.10.10' and the source address (SA) '100.100.100.40' is not registered in the mapping table 131 yet. The above information is registered in the mapping table with a new table number '6'. Content of the mapping table 131 is updated in this way.

Referring to the source address (SA), the report message 121 is found received at the fourth LAN port $118_4$. Then, the bitmap indicating the forwarding destination port becomes '0001'.

Furthermore, next report message 121 requesting subscribing to the same multicast group (The DA is '238.10.10.10' and the SA is '100.100.100.40'.) is received at the first LAN port $118_1$. The bit corresponding to the first LAN port $118_1$ is allocated to '1'. As a result, the bitmap indicating the forwarding destination ports in the lines of the table number 6 changes to '1001'. In such a way, ports of a plurality of forwarding destinations are designated.

FIG. 3 is described again. In the last Step S205, the network processor 113 writes, in the VLAN table in the layer 2 switch 114, the destination address (DA), the VLAN-ID (VID) 123 and information on a bitmap indicating the forwarding destination port, via the management interface 133.

Figure 6:
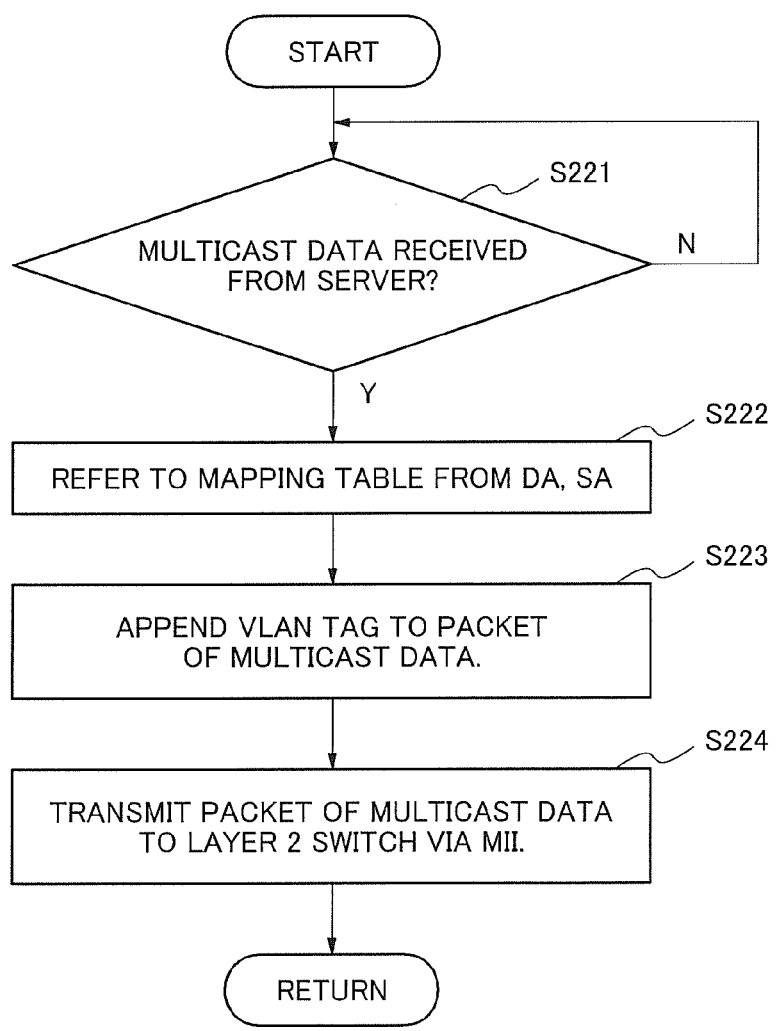
FIG. 6 is a flow chart illustrating an example of delivery processing of a network processor, which receives multicast data according to the second exemplary embodiment.

FIG. 6 is a flow chart showing an example of processing of delivering by a network processor when multicast data is sent. With reference to FIGS. 2 and 6, when the multicast data is delivered from the multicast distribution server 103, the network processor 113 in the router 101 receives the data (step S221:Y). The network processor 113 refers the mapping table 131 based on the destination address (DA) and the source address (SA) (Step S222). The network processor 113 appends a VLAN tag 142 including the VLAN-ID 123 to the packet 122 in the multicast data (Step S223), and converts the packet 122 into the packet 124.

Figure 7:
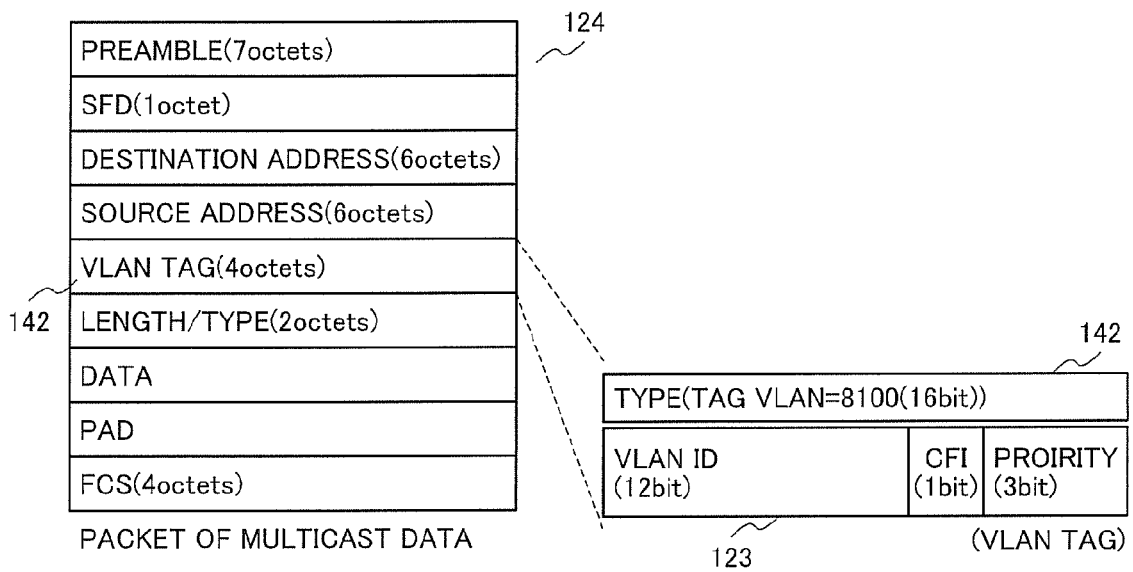
FIG. 7 indicates an example of a packet of multicast data after VLAN tag is added thereto according to the second exemplary embodiment.

FIG. 7 illustrates an example of a packet of the multicast data including the VLAN tag. Four octets, i.e. 32 bits of the VLAN tag 142 are appended to the packet 124 of the multicast data. The VLAN tag 142 includes a frame format conforming to IEEE802.1q specifying the VLAN-ID 123 and a tagging method thereof.

The packet 124 of the multicast data is sent to the layer 2 switch 114 from the network processor 113 (FIG. 6: Step S224). With reference to the VLAN table 132, the layer 2 switch 114 receiving the packet 124 designates a forwarding destination. The packet 124 of the multicast data is transmitted to the designated terminal 104.

Figure 8:
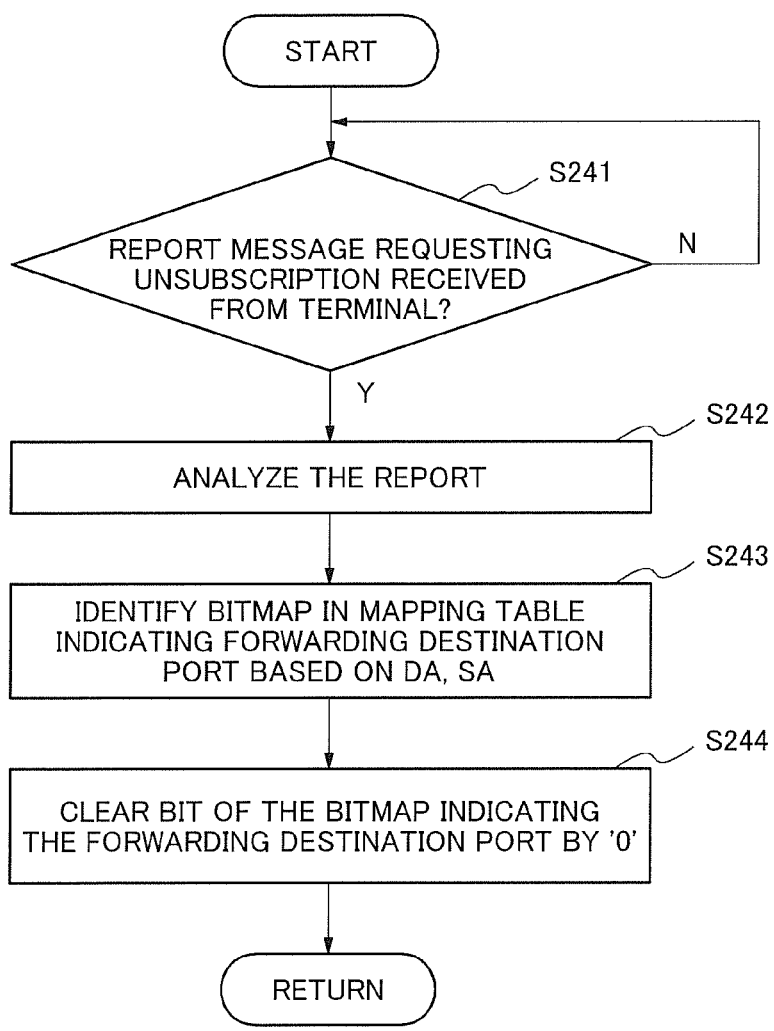
FIG. 8 is a flow chart illustrating an example of processing of unsubscription of a terminal from a multicast group according to the second exemplary embodiment.

FIG. 8 is a flow chart showing an example of processing to unsubscribe a terminal from the multicast group. The network processor 113 receives the report message 121 requesting unsubscription from the multicast group sent via the layer 2 switch 114 from a terminal 104 (Step S241).

The network processor 113 receives the report message 121 for unsubscription (step S241:Y). The network processor 113 analyzes the report message 121, and extracts the destination address (DA) and the source address (SA) (Step S242). The network processor 113 searches for the forwarding destination part in the mapping table 131, based on the extracted destination address (DA) and the source address (SA). The forwarding destination port sending the report message 121 of the unsubscription request is identified (Step S243). The bitmap table indicating the forwarding destination port is updated. The table number, in which the destination address (DA) and the source address (SA) are respectively identical to the destination address and the source address of the message, is identified, and the bit of the forwarding destination port to unsubscribe in the bitmap is cleared to '0' (Step S244).

For example, regarding the multicast group, to which the first to third LAN ports $118_1$-$118_3$ subscribe, the bitmap indicating the forwarding destination port for the table number corresponding to the multicast group is '1110'. The report message 121 requesting unsubscription is transmitted from the second terminal $104_2$ (Step S241). A bit corresponding to the second LAN port $118_2$ in a bitmap indicating the forwarding destination port is cleared to '0', and the bitmap indicating the forwarding destination port is updated to '1010'.

In the above-mentioned example, even after the report message 121 requesting unsubscription is processed, terminals, which still subscribe to the multicast group, exist. The terminals are the first and third LAN port $118_1$ and $118_3$. When the first and third LAN ports $118_1$ and $118_3$ are also unsubscribed, no terminal subscribes. The bitmap indicating the forwarding destination port for the table number corresponding to the multicast group including no terminal becomes '0000'. The table number in which the bitmap indicating the forwarding destination port becomes '0000' is then reused as a table number for a multicast group newly joined. That is, according to the exemplary embodiment, 4096 multicast groups, each having a bit ranging from '0' to '4095' are assigned dynamically to groups used in the router 101.

When the mapping table 131 is updated, the destination address (DA), the source address (SA), VLAN-ID (VID) 123 and the forwarding destination port in the VLAN table 132 of the layer 2 switch 114 corresponding to the update of the mapping table 131 are also updated via the management interface 133. The mapping table 131 is made matched with the VLAN table 132 so that the corresponding multicast data is not transmitted to the unsubscribed terminal 104.

The multicast data distribution system 100 of the exemplary embodiment described above includes following advantages. First, the network processor 113 appends the VLAN-ID 123 to the multicast data and sends the converted multicast data to the layer 2 switch 114. Accordingly, the layer 2 switch 114 can transfer the multicast data to the terminal 104 designated only by the destination address (DA) and the VLAN-ID 123, irrespective of the protocol (MLDv2, MLDv1, IGMPv3, IGMPv2 or IGMPv1).

According to the exemplary embodiment, the report message 121 is analyzed by the network processor 113. In MLDv2 and IGMPv3 protocols of the latest version, the source address (SA) also becomes a judgment condition for transfer in addition to the destination address (DA). Even the layer 2 switch 114, which does not implement such MLDv2 or IGMPv3 protocol, can transfer the multicast data.

Moreover, according to the exemplary embodiment, processing of each part included in the router 101 is realized by software processing on a processor. Therefore, according to the exemplary embodiment, an existing router can be also operated as a multicast router by modifying or by adding necessary functions to the control program of the existing router, without modifying hardware.

Also, according to the exemplary embodiment, a data delivery service provided by an internet service provider is restricted only to contracted terminals. Accordingly, the data distribution apparatus of the exemplary embodiment enjoys diversification of data delivery services. Since data can be delivered only to the contracted terminal 104, a security related to information leakage and the like improves. As unnecessary data delivery to a terminal connected to the router 101 other than the forwarding destination terminal is prevented, a load of traffic on the network is reduced.

<The First Modification>

Figure 9:
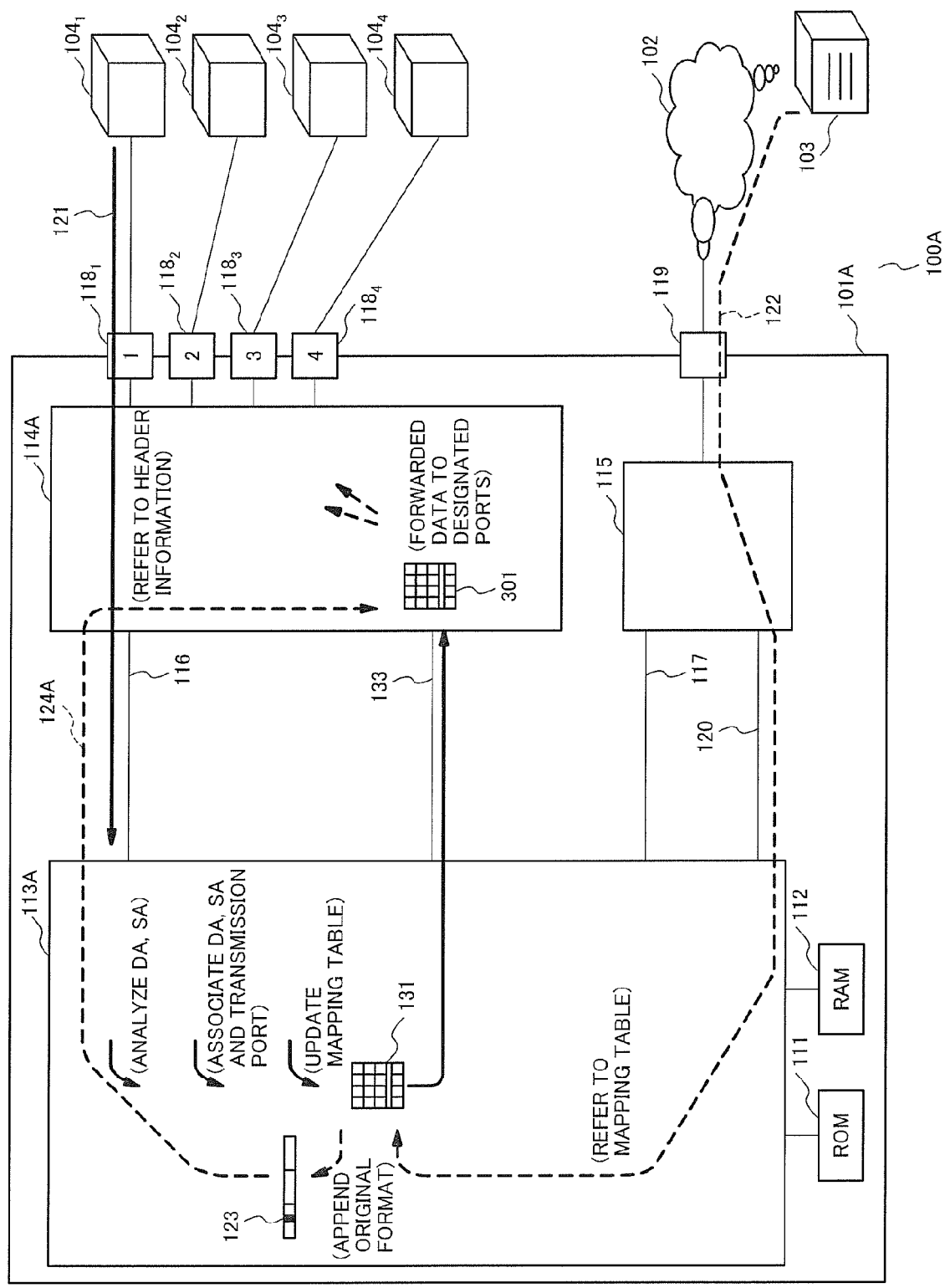
FIG. 9 is a block diagram illustrating an example of a multicast data distribution system according to a first modification example.

FIG. 9 is a block diagram showing an example of a multicast data distribution system of the first modification. In FIG. 9, the same symbol as that in FIG. 2 is attached to the same part as that in FIG. 2, and descriptions associated with such parts are omitted appropriately. A multicast data distribution system 100A of the first modification adopts a layer 2 switch 114A, which does not distinguish a forwarding packet using the VLAN-ID 123 as described in the above-mentioned exemplary embodiment, to transfer multicast data.

In the first modification, processing of making the first to fourth terminals $104_1$-$104_4$ on the viewer's side subscribe or unsubscribe to a multicast group, that is, a procedure of registering or updating of the mapping table 131 are quite identical to the procedure in the previous exemplary embodiment. However, a network processor 113A of a router 101A converts a packet 122 of the multicast data, sent from the multicast distribution server 103, into an original format unique to a vendor with reference to the mapping table 131.

On the other hand, the layer 2 switch 114A receiving a packet 124A converted into the original format does not include the VLAN table 132 as shown in FIG. 2, but includes a forwarding destination information correspondence table 301. The forwarding destination information correspondence table 301 identifies the original format specific to a vendor, and issues an instruction to transmit a packet for delivery to a relevant port of the first to fourth LAN ports $118_1$-$118_4$.

Figure 10:
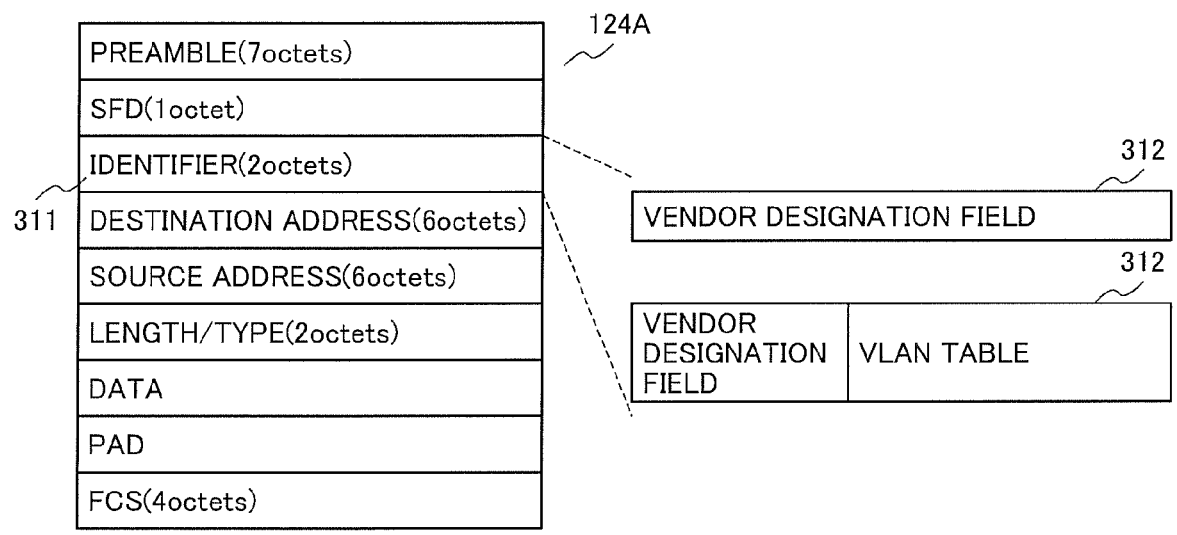
FIG. 10 illustrating an example of a packet of multicast data, to which an identifier unique to a vendor is added according to the first modification example.

FIG. 10 shows an example of a packet of multicast data, to which an identifier unique to a vendor is appended. The packet 124A of the original format, specific to the vendor, includes an identifier 311 of two octets inserted between a start frame delimiter (SFD) of an octet and a destination address of six octets. The original format specific to the vendor is not limited to the format form of this exemplary embodiment. A vendor may originally set a specification of a format of the packet, such as a header, a trailer or a tag similar to a tag by IEEE802.1q. However, the packet format needs to include forwarding information (forwarding destination port designation information) indicating to which port of the first to fourth LAN ports $118_1$-$118_4$ the packet 124A is transferred.

In the first modification, a field of a VLAN table 312T, indicating a relation between forwarding destination information and the port 118, is arranged in a vendor designation field 312 included in the identifier 311. As a result, the layer 2 switch 114A shown in FIG. 9 transmits a packet for delivery to a relevant port of the first to fourth LAN ports $118_1$-$118_4$ without having the VLAN table 132 as shown in FIG. 2.

Figure 11:
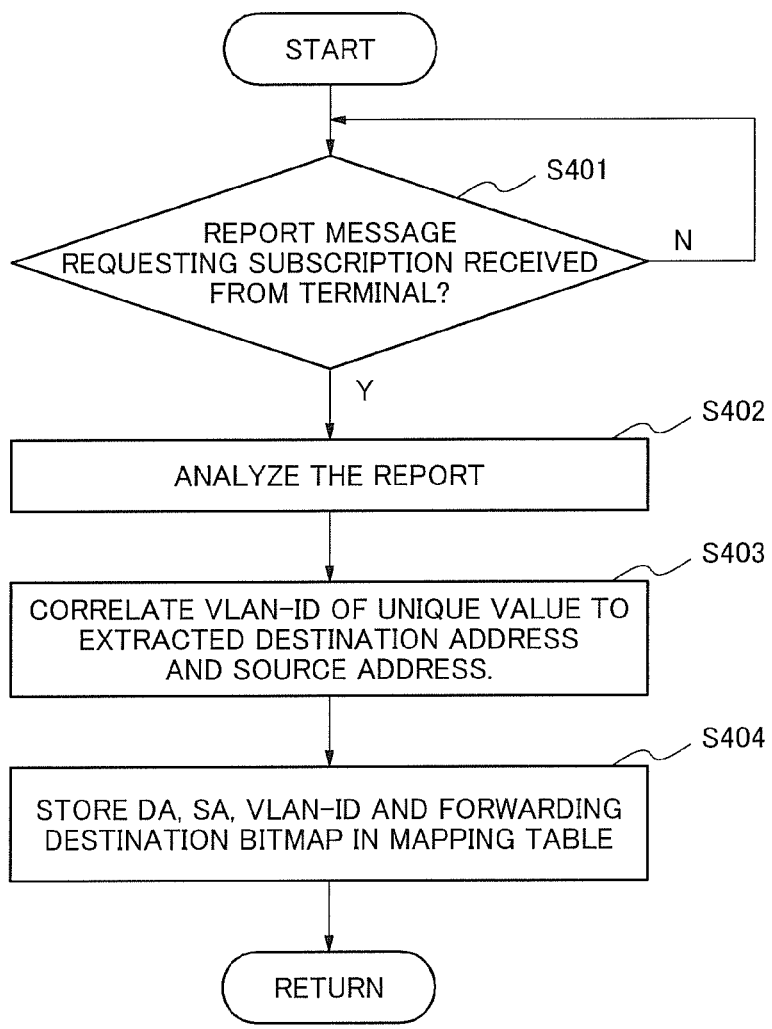
FIG. 11 is a flow chart illustrating an example of processing of a network processor which is performed when a terminal transmits a report message according to the first modification example.

FIG. 11 is a flow chart showing an example of processing which the network processor 113A performs when the terminal 104 transmits the report message 121 with a subscription request in the first modification. The flow chart corresponds to FIG. 3 in the exemplary embodiment. With reference to FIGS. 9 and 11, the report message 121 from the first to fourth terminals $104_1$-$104_4$ requests subscription or unsubscription to a multicast group or the like to the multicast distribution server 103. The network processor 113A receives the report message 121 requesting subscription to the multicast group, sent from the terminal 104 via the layer 2 switch 114A (Step S401).

Upon receiving the report message 121 of the subscription request (Y), the network processor 113 analyzes the report message 121 (Step S402) and extracts necessary information therefrom. The necessary information is the destination address (DA) and the source address (SA). The network processor 113 associates the VLAN-IDs 123 having a unique value with each of the extracted destination address (DA) and the source address (SA) (Step S403). The destination address (DA), the source address (SA), the VLAN-ID 123 and a bitmap indicating the forwarding destination port is written and stored in the mapping table 131 (Step S404).

The processing above is identical to processing in the exemplary embodiment.

Figure 12:
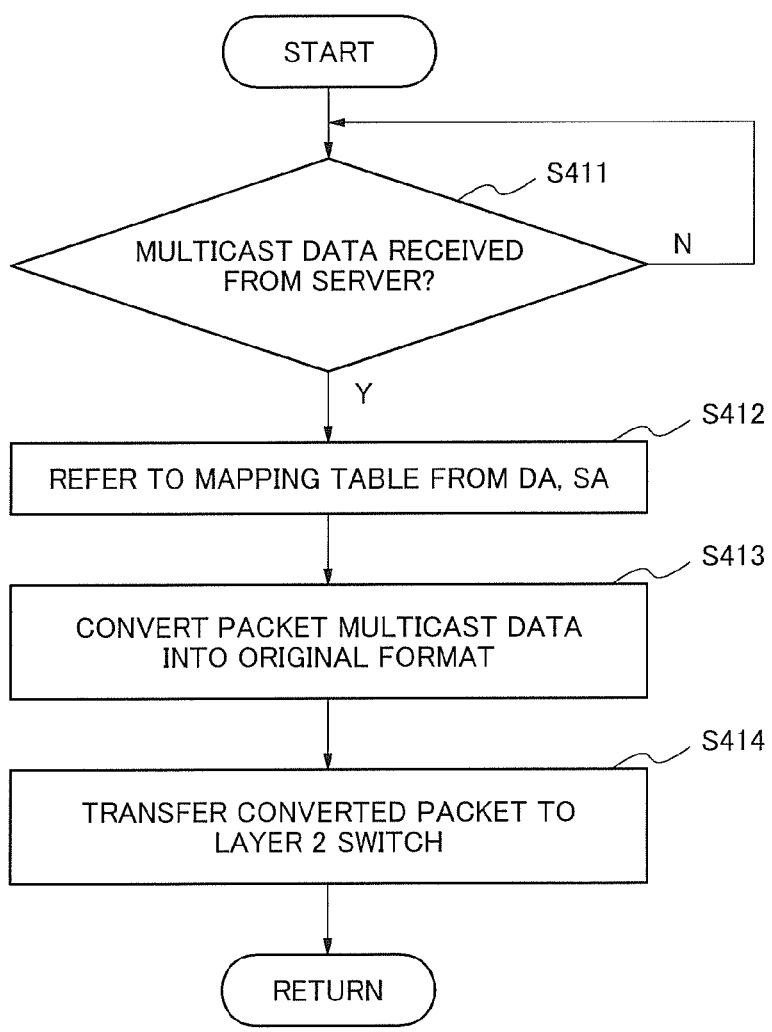
FIG. 12 is a flow chart illustrating an example of processing of a network processor which receives multicast data according to the first modification example.

FIG. 12 is a flow chart showing an example of processing of delivering by the network processor when multicast data is sent. With reference to FIGS. 9 and 12, when multicast data is delivered from the multicast distribution server 103, the network processor 113A in the router 101A receives the multicast data (step S411). The network processor 113A refers the mapping table 131 based on the destination address (DA) and the source address (SA) (Step S412).

The network processor 113A converts the packet 122 of the received multicast data into an original format (Step S413). A port of the first to fourth LAN ports $118_1$-$118_4$ corresponding to the destination address is incorporated into the original format as the identifier 311 for the forwarding destination information. The packet 124A converted into the original format is sent to the layer 2 switch 114 (Step S414).

In the first modification, a transmission port is distinguished by the layer 2 switch 114A based on the VLAN table 312T included in the identifier 311, and data is transferred to the designated port. As a result, the same effect as in the previous exemplary embodiment is obtained.

<The Second Modification>

In the exemplary embodiment and the first modification, the network processors 113 and 113A shown in FIGS. 2 and 9 analyze the report message 121 transmitted to the multicast distribution server 103 from the first to fourth terminals $104_1$-$104_4$. Upon receiving the packet 122 of the multicast data from the multicast distribution server 103, the network processors 113 and 113A designate a forwarding destination of the packet 122 based on the result of analysis for the report message 121. In the exemplary embodiment and the first modification, the routers 101 and 101A operate actively.

In the second modification, a user registers and updates the mapping table 131 shown in FIG. 2 using a user interface. Unsubscription from a multicast group is also processed similarly.

Figure 13:
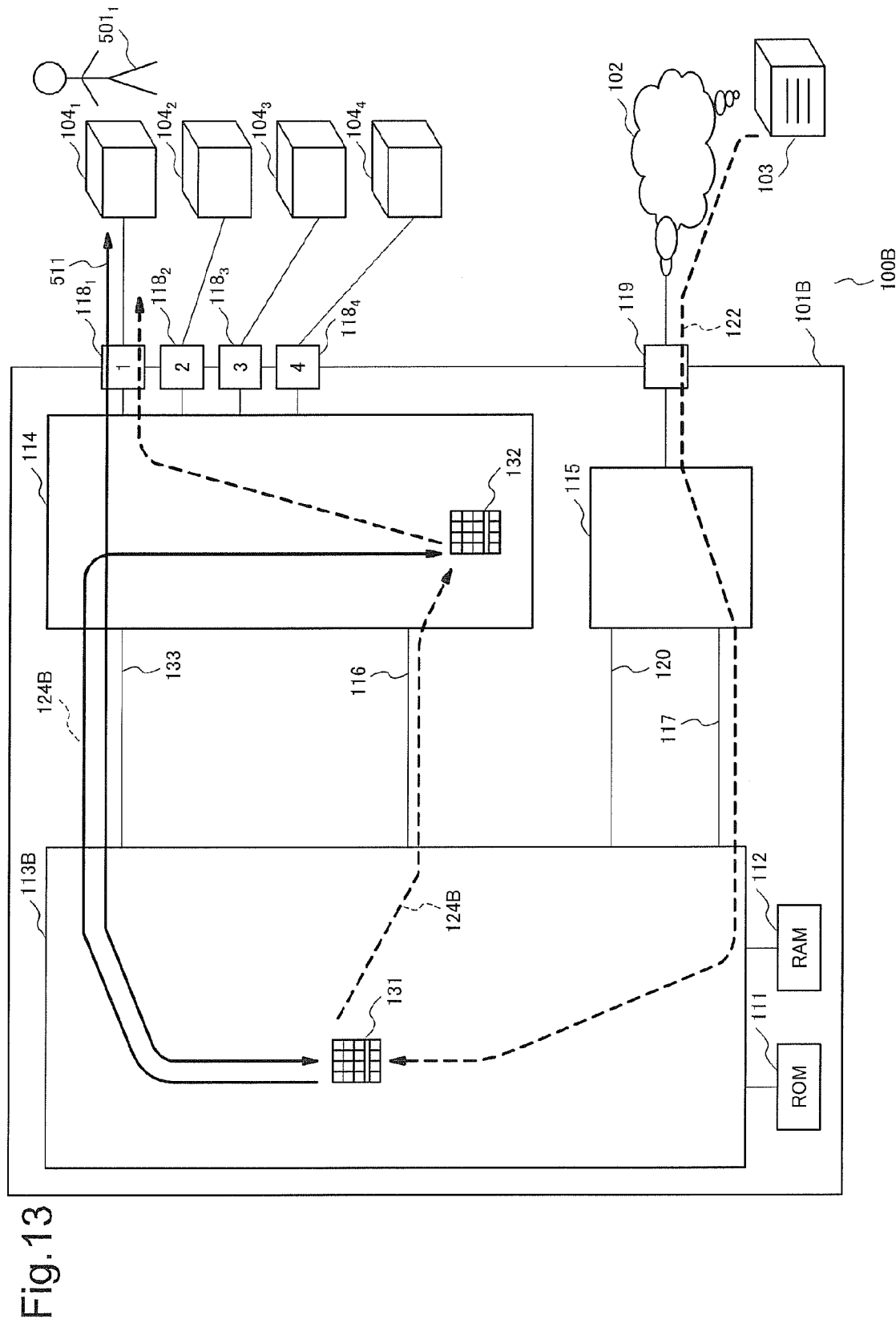
FIG. 13 is a block diagram showing an example of a multicast data distribution system according to a second modification example.

FIG. 13 is a block diagram showing an example of a multicast data distribution system of the second modification. In FIG. 13, the same symbol as that in FIG. 2 is attached to the same part as that in FIG. 2, and description is omitted appropriately. In a multicast data distribution system 100B of the second modification, a ROM 111B connected to a network processor 113B stores a control program. The control program supports web setting by GUI (Graphical User Interface) or setting by a command, with respect to processing of the mapping table 131 of the router 101B.

For example, a first user $501_1$ operates the first terminal $104_1$ to display, as shown in FIGS. 5A and 5B, a content of the mapping table 131 on a Web site of the internet on a user's display. The first user $501_1$ refers the displayed content, and subscribes or unsubscribes to the multicast group. The content of the mapping table 131 may be converted into a packet for display to be transmitted to the first terminal $104_1$ and be directly displayed on the display. In the latter case, the first user $501_1$ operates the first terminal $104_1$ and directly changes the content of the mapping table 131.

Setting information 511, set by the first user $501_1$ through the operation of the mapping table 131 using a GUI, is a destination address (DA) of a multicast subscription group or a source address (SA) of a subscribing terminal. The VLAN-ID 123 may be included in the setting information 511. The setting information 511 is written and stored in the mapping table 131 in the ROM 111B, as in the exemplary embodiment. The destination address (DA) or the VLAN-ID 123 is sent to the layer 2 switch 114 via the management interface 133.

In the multicast data distribution system 100B of the second modification, upon receiving the packet 122 of the multicast data from the multicast distribution server 103, the network processor 113B appends a VLAN tag to the packet 122 and converts the packet data 122 into a packet data 124B, as in the exemplary embodiment. The network processor 113B sends the packet data 124B to the layer 2 switch 114. The layer 2 switch 114 determines the forwarding port from the destination address (DA) and the VLAN-ID, and transmits the packet data of the multicast data to the designated port.

<The Third Modification>

According to the exemplary embodiment, a unique VLAN-ID 123 is assigned to a combination of the destination address (DA) and the source address (SA). The VLAN-ID 123 is assigned to each of the 4096 multicast groups, where index value of the VLAN-ID 123 ranges from '0' to '4095'. However, when the number of the combination of the destination address (DA) and the source address (SA) exceeds 4096, the VLAN-ID 123 runs short.

Figure 14:
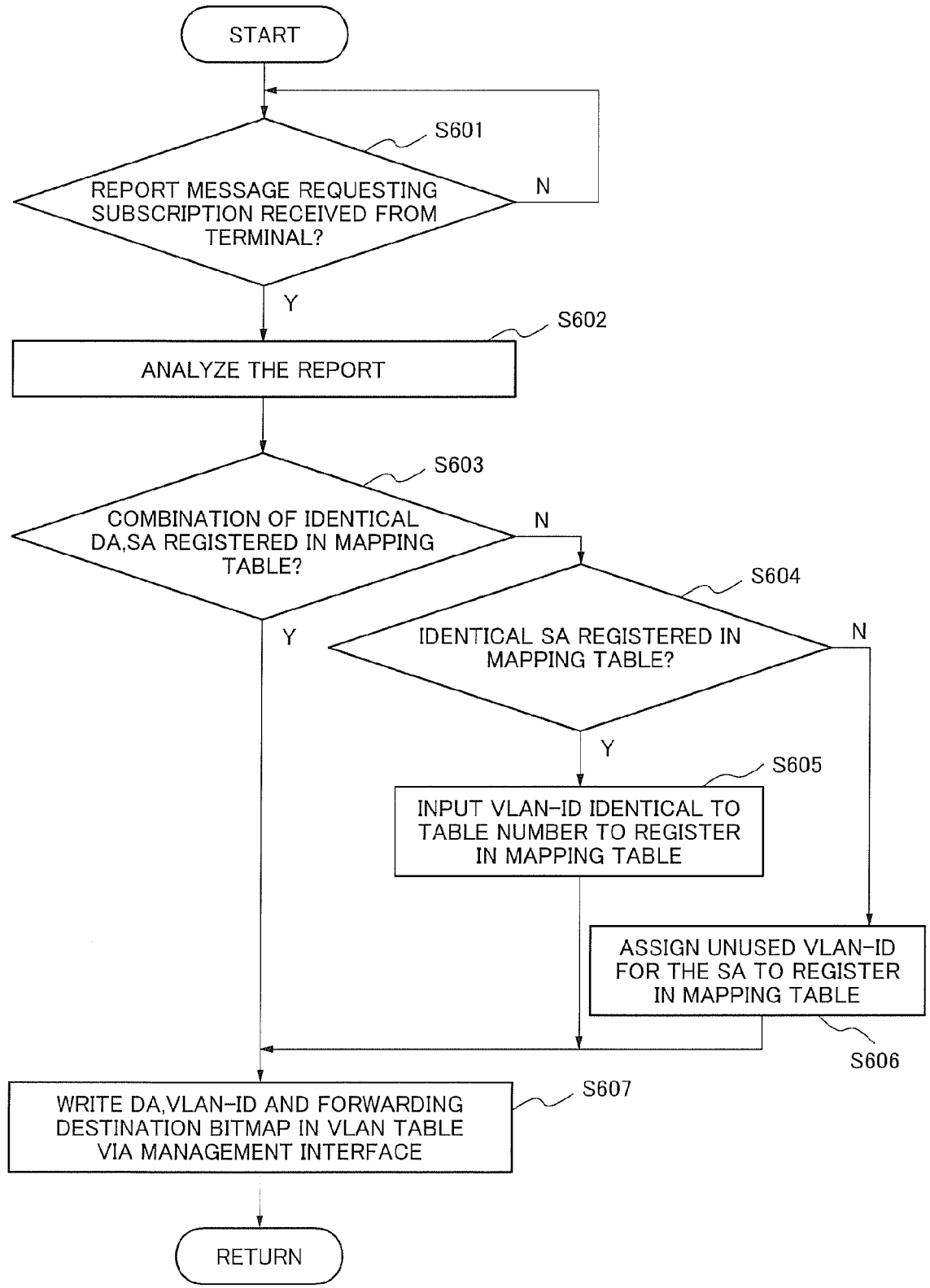
FIG. 14 is a flow chart illustrating an example of processing of management of VLAN-ID according to a third modification example.

FIG. 14 is a flow chart showing an example of processing of management of the VLAN-ID in the third modification. With reference to FIGS. 2 and 14, a network processor 113C (not shown) receives the report message 121 that requests subscription to a multicast group sent from the terminal 104 via the layer 2 switch 114 (Step S601).

When the report message 121 requesting subscription is received (Y), the network processor 113C analyzes the message 121 (Step S602). The network processor 113C extracts a set of the destination address (DA) and the source address (SA) from the message 121. The network processor 113C checks whether or not the set of the addresses from the message is already registered in the mapping table 131 (Step S603).

When the set of the addresses from the message is not registered in the mapping table 131 yet (N), the network processor 113C further checks whether or not the source address (SA) from the message is already registered in the mapping table 131 (Step S604). When the source address (SA) from the message is already registered in the mapping table 131 (Y), the set of the addresses from the message is registered in the mapping table 131 referring to the VLAN-ID 123 assigned to the already registered source address (SA) (Step S605). When the source address (SA) from the message is not registered in the mapping table 131 (step S604:N), an unused VLAN-ID 123 is assigned to the source address (SA) from the message, and the set of the addresses from the message is registered in the mapping table 131 (Step S606).

When the set of the destination address (DA) and the source address (SA) extracted in Step S603 is judged to be registered in the mapping table 131 (Y), or when the processing of Step S605 or Step S606 is completed, the network processor 113C writes, in the VLAN table in the layer 2 switch 114, information on the destination address (DA) and the VLAN-ID (VID) 123 and the bitmap indicating the forwarding destination port, via the management interface 133 (Step S607).

In the exemplary embodiment and the various modifications described above, operations of the network processors 113-113C is realized by software which executes a control program. However, following functions can be realized by hardware logics instead of the software processing by the network processors 113-113C:

(1) Analyzing the report message 121 or a check of the destination address (DA) and the source address (SA);

(2) Registering the addresses in the mapping table 131 or updating of the addresses;

(3) Checking the destination address (DA) and the source address (SA) included in the packet 122 of the multicast data received from the multicast distribution server 103;

(4) Searching data in the mapping table 131 based on a parameter including the addresses; and (5) Appending a VLAN tag or vendor specific data as designation information to received data based on a search result.

All or part of the above functions can be realized by hardware logics.

Elements of hardware logics having the above functions may be installed in the network processors 113-113C. Furthermore, the multicast data forwarding functions can be realized by adding a logic circuit such as a gate array and FPGA (Field Programmable Gate Array) (not illustrated) between the network processors 113-113C and the layer 2 switches 114, 114A.

In the exemplary embodiment and the various modifications, the multicast distribution server 103 and the terminal 104 are exemplified ones, and a number of servers or terminals is not limited to the exemplary embodiments.

Figure 15:
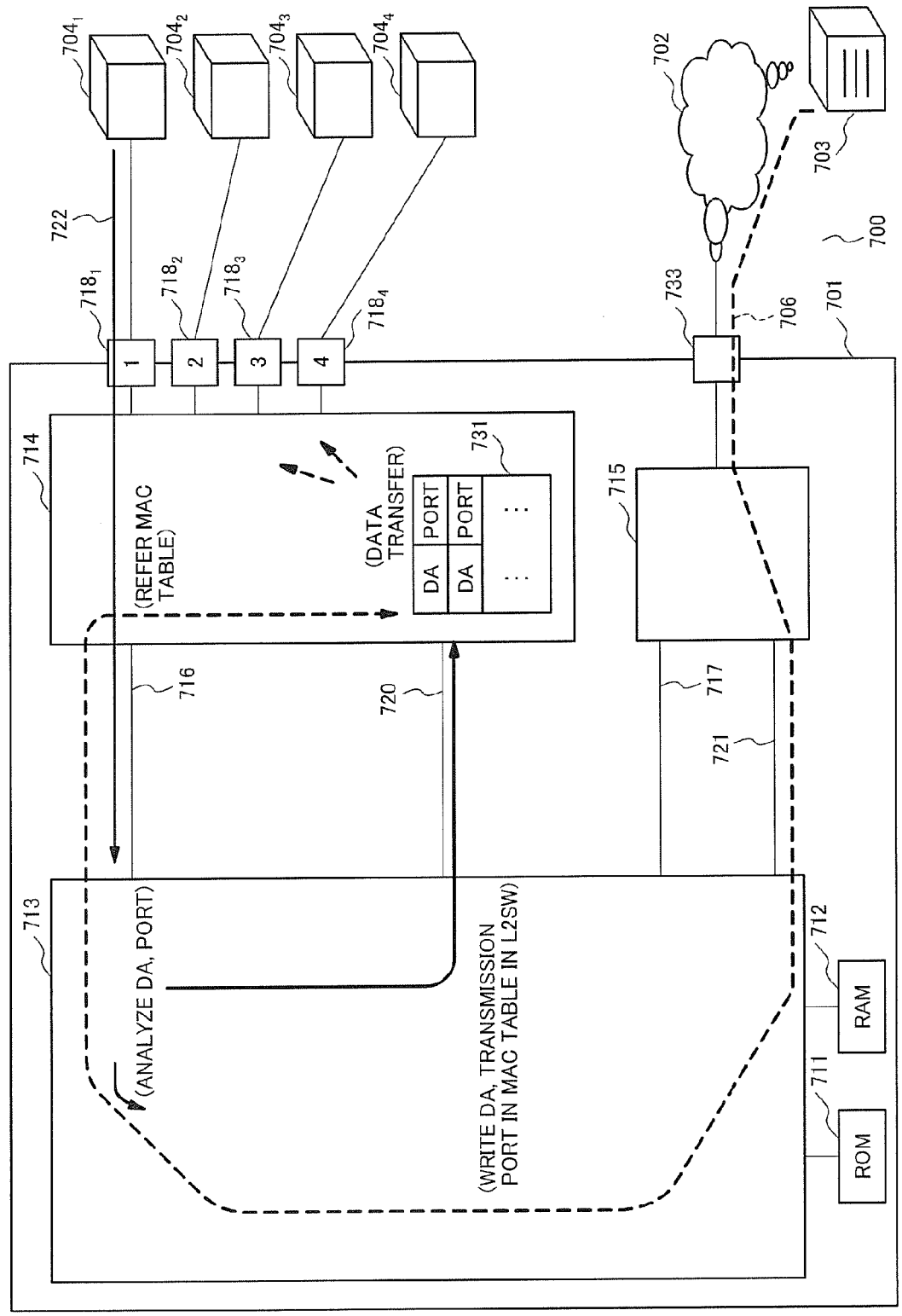
FIG. 15 is a block diagram showing a multicast data distribution system to which a protocol of a version previous to the latest version is applied, in a related art.

In the related art described in the background art referring to FIG. 15, the router 701, controlled by a protocol of a related technology, does not support the latest protocol such as MLDv2 or IGMPv3. Therefore, the router 701 cannot properly process a request of subscription or unsubscription to the multicast group of the MLDv2 or the IGMPv3. Accordingly, the router 701 cannot reliably transmit data to subscriber terminals as restricted forwarding destinations for the multicast data.

In FIG. 15, the layer 2 switch 714 can generally store the MAC address of a connected terminal in the inner MAC table. A packet to the stored MAC address is transmitted only to the port, to which the terminal is connected. As a result, unnecessary traffic to other ports is excluded, and the network is used efficiently. However, for a packet to a multicast address, the layer 2 switch 714 cannot generally perform the above address learning. Without control by a network processor, a multicast packet is transmitted to all ports. A multicast transfer apparatus is required not to transmit multicast data to a terminal, which does not subscribe to the multicast group.

In order to satisfy the requirement, a terminal connected to a port transmits a MLD report or an IGMP report for subscribing to the multicast group to a network processor. The network processor registers DA and a forwarding destination port in the MAC table inside the layer 2 switch, so that a packet for the multicast group is transmitted to the subscribed port. Thereby, the layer 2 switch can transmit the multicast data only to the designated port. IGMPv3 and MLDv2 are the latest versions at present in IGMP and MLD, respectively, for multicast group subscription. In the protocols, a multicast group has to be determined not only by the destination address (DA) but by a combination of the destination address and the source address. A MAC address table of an existing layer 2 switch can only set the DA, but does not support the IGMPv3 or MLDv2 protocol. Thus, it is impossible to transmit the multicast data only to the designated port using the combination of the destination address and the source address. Operation, in which the multicast data is sent using the latest protocol to a router supporting a protocol of a version previous to the latest one, will be described.

Figure 16:
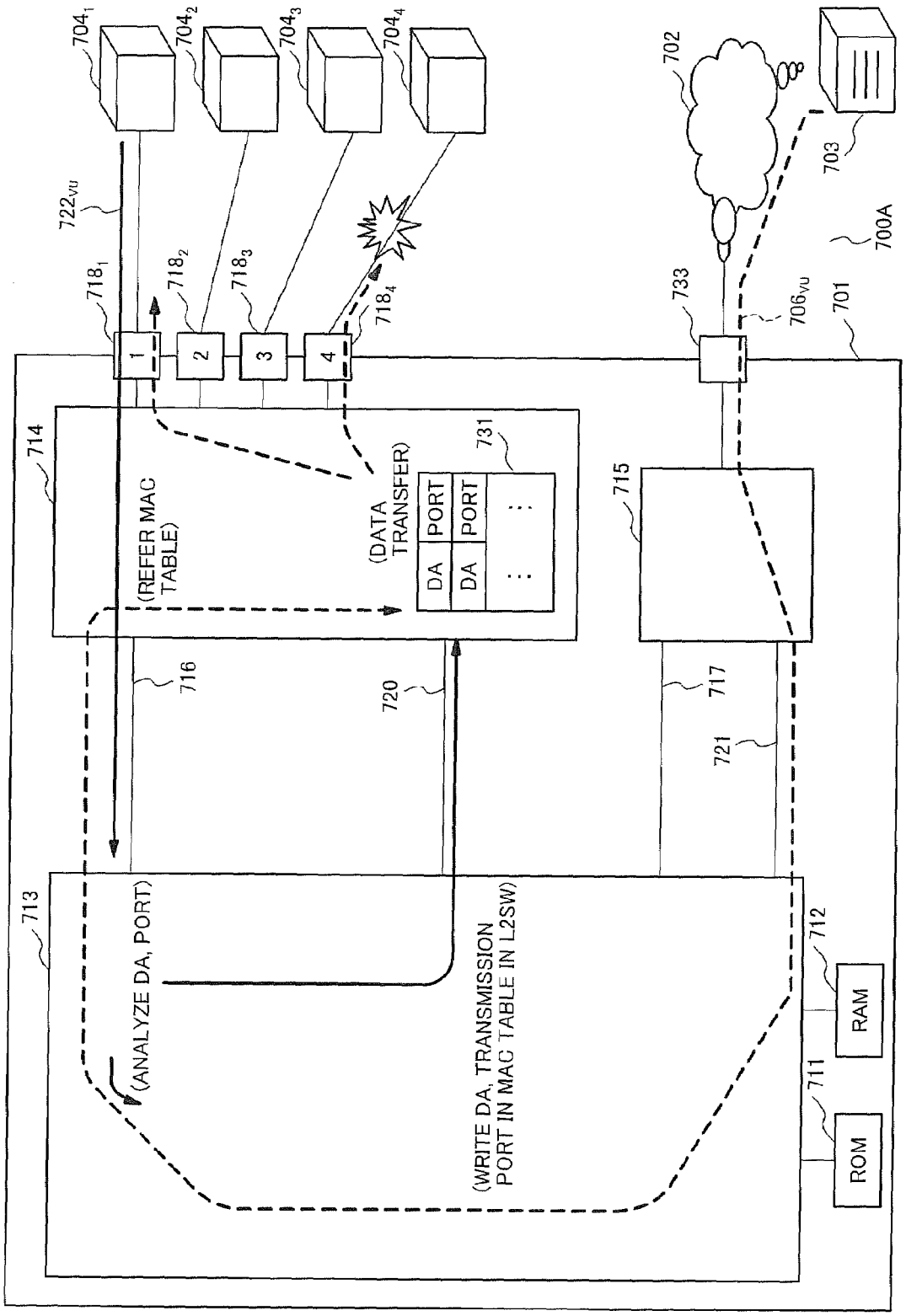
FIG. 16 is a conceptual diagram showing operation which is performed when multicast data is sent using the latest protocol to the router corresponding to a protocol of a version previous to the latest version, in the related art.

FIG. 16 is a conceptual diagram showing operation in which the multicast data is sent by the latest protocol to the router supporting a protocol of a previous version to the latest version. The router 701 supports a protocol of the version previous to the latest version. According to the report message 722VU of the protocol of the upgraded version, the first terminal 704₁ connected to the router 701 registers with a multicast group. Also, according to the report message 722VU, the fourth terminal 704₄ unsubscribes from the multicast group. A protocol of the version 1 or the version 2 of IGMP, or a protocol of the version 1 of MLD is applied to the router. Only the destination address (DA) and a forwarding destination port of data are written in the MAC table 731 used by the router 701.

A multicast data 706VU is sent to the router 701 via a WAN (Wide Area Network) port 733 from the multicast distribution server 703. The multicast data 706VU supports a protocol of the version 3 of IGMP or to a protocol of the version 2 of MLD.

In a multicast data distribution system 700A shown in FIG. 16, the router 701 includes only the MAC table 731 the same as the multicast data distribution system 700 shown in FIG. 15. The router 701 does not support the latest protocol. In the protocol of a version previous to the latest version, a multicast group is determined only by the destination address. That is, only the destination address of the multicast data received from a multicast server is a determination factor of the forwarding destination port for the router 701. The router 701 does not hold the source address (SA) as an element for determining a delivery destination. On the other hand, in a network supporting the latest protocol, because the source address is a determination factor of the forwarding destination in addition to the destination address, the multicast data is also transmitted to a terminal, which does not subscribe to the multicast group. That is, the layer 2 switch 714 transfers the multicast data 706VU not only to the first LAN port 718₁ but also to the fourth LAN port 718₄, which suspends delivery. Although not shown in FIG. 16, the multicast data 706VU is delivered to other remaining terminals 704₂ and 704₃.

As described above, according to the exemplary embodiment and modifications, a correspondence table representing a relation among (1) the source address defining locations of respective terminals to which the multicast data is delivered, (2) the destination address of the multicast data, and (3) a port to which each of the terminals is connected, is created in an apparatus delivering the multicast data. As a result, because the source address is associated with the destination address, even an existing multicast data distribution apparatus including a router, in which a protocol managing a subscriber of the multicast group does not support the latest version, can reliably deliver the multicast data without changing hardware.

Furthermore, because a data delivery scheme that variety of services by providers are supported, since each of data from the provider are delivered only to a contracted terminal. In addition, security against information leak is improved. Network traffic is advantageously reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A data distribution apparatus, which delivers multicast data to each of terminals belonging to a multicast group at an L2 protocol, comprising:
a processor;
a non-transitory computer-readable medium storing a computer program executable by the processor to implement:
a correspondence table generating unit to generate a table, which includes a source address of the terminal and a destination address for requesting the multicast data in association with port information of the terminal;
an address discrimination unit to discriminate a combination of the destination address and the source address contained in the multicast data being received;
a forwarding destination information generation unit to generate forwarding destination information, which designates a forwarding destination of the multicast data by obtaining the port information of the terminal, included in the correspondence table, corresponding to the discriminated combination of the destination address and the source address, and inserts the forwarding destination information in the multicast data for transfer to an L2 switch; and
a port selection unit and provided in the L2 switch to select each port to transfer the multicast data with referring to the forwarding destination information inserted in the multicast data and a routing table provided in the L2 switch at the L2 protocol,
wherein the correspondence table generating unit includes an address extraction unit to extract the source address of the terminal and the destination address for requesting the multicast data contained in a control message on the multicast group transmitted from the terminal for managing delivery of the multicast data,
wherein the correspondence table generating unit generates a virtual LAN (VLAN)-ID, which is unique value corresponding to the combination of the destination address and the source address included in the correspondence table, as one of contents of the correspondence table, and the forwarding destination information generation unit inserts the VLAN-ID corresponding to the combination of the destination address and the source address discriminated by the address discrimination unit; and wherein the contents of the correspondence table is transferred to the routing table in the L2 switch,
wherein the routing table and the correspondence table operate in conjunction with one another to transfer the multicast data, and the correspondence table is an L3 table.

2. The data distribution apparatus according to claim 1, wherein the correspondence table generating unit assigns the same VLAN-ID, which has already been assigned to the source address when the identical source address is newly registered.

3. The data distribution apparatus according to claim 1, wherein the correspondence table includes a bitmap, which manages the delivery of the multicast data to the port, and is updated by the control message on the multicast group transmitted from the terminal.

4. The data distribution apparatus according to claim 1, wherein the correspondence table generating unit includes a user interface to receive information on the correspondence table from the terminal to update contents of the correspondence table.

5. The data distribution apparatus according to claim 1, wherein the forwarding destination information includes an original format unique to a vendor.

6. The data distribution apparatus of claim 1, wherein the multicast data is delivered only to each terminal belonging to the multicast group, and not to any other terminal.

7. The data distribution apparatus of claim 1, wherein the multicast data delivered by the data distribution apparatus is delivered only to each terminal belong to the multicast group, and to no other terminal.

8. A data distribution method for delivering multicast data to each of terminals belonging to a multicast group at an L2 protocol, comprising:
generating a correspondence table, which includes a source address of the terminal and a destination address for requesting the multicast data in association with port information of the terminal;
discriminating a combination of the destination address and the source address contained in the multicast data being received;
generating forwarding destination information, which designates a forwarding destination of the multicast data by obtaining the port information of the terminal, included in the correspondence table, corresponding to the discriminated combination of the destination address and source address;
inserting the forwarding destination information in the multicast data for transfer to an L2 switch; and
selecting each port to transfer the multicast data with referring to the forwarding destination information inserted in the multicast data and a routing table in the L2 switch at the L2 protocol,
wherein the generating the correspondence table step includes extracting the source address of the terminal and the destination address for requesting the multicast data contained in a control message of the multicast group transmitted from the terminal for managing delivery of the multicast data,
wherein the generating the correspondence table step further includes generating a virtual LAN (VLAN)-ID, which is unique value corresponding to the combination of the destination address and the source address included in the correspondence table, as the forwarding destination information, and wherein the contents of the correspondence table is transferred to the routing table in the L2 switch,
wherein the routing table and the correspondence table operate in conjunction with one another to transfer the multicast data, and the correspondence table is an L3 table.

9. The data distribution method according to claim 8, wherein the generating VLAN-ID step includes assigning the same VLAN-ID, which has already been assigned to the source address when the identical source address is newly registered.

11. The data distribution method according to claim 8, wherein the correspondence table includes a bitmap, which manages the delivery of the multicast data to the port, and is updated by the control message on the multicast group transmitted from the terminal.

11. The data distribution method according to claim 8, wherein the generating the correspondence table step includes updating a user interface to receive information on the correspondence table from the terminal to update contents of the correspondence table.

12. The data distribution method according to claim 8, wherein the forwarding destination information includes an original format unique to a vendor.

13. A non-transitory computer-readable data-recording medium having a computer program stored thereon, wherein execution of the computer program by a processor causes a method to be performed, wherein the method is for delivering multicast data to a terminal of a multicast group at an L2 protocol, the method comprising:

generating a correspondence table, which includes a source address of the terminal and a destination address for requesting the multicast data in association with port information of the terminal;

discriminating a combination of the destination address and the source address contained in the multicast data being received;

generating forwarding destination information, which designates a forwarding destination of the multicast data by obtaining the port information of the terminal, included in the correspondence table, corresponding to the discriminated combination of the destination address and source address;

inserting the forwarding destination information in the multicast data for transfer to an L2 switch; and selecting each port to transfer the multicast data with referring to the forwarding destination information inserted in the multicast data and a routing table in the L2 switch at the L2 protocol, wherein the generating the correspondence table step includes extracting the source address of the terminal and the destination address for requesting the multicast data contained in a control message of the multicast group transmitted from the terminal for managing delivery of the multicast data, wherein the generating the correspondence table step further includes generating a virtual LAN (VLAN)-ID, which is unique value corresponding to the combination of the destination address and the source address included in the correspondence table, as the forwarding destination information, and wherein the contents of the correspondence table is transferred to the routing table in the L2 switch, wherein the routing table and the correspondence table operate in conjunction with one another to transfer the multicast data, and the correspondence table is an L3 table.

\* \* \* \* \*